United States Patent [19]

Steinberg

[11] Patent Number: 5,379,053
[45] Date of Patent: Jan. 3, 1995

[54] ELECTROMAGNETIC CURSOR CONTROL DEVICE FOR A COMPUTER DISPLAY

[76] Inventor: John D. Steinberg, 320 Lake St., #304, Huntington Beach, Calif. 92648

[21] Appl. No.: 913,214

[22] Filed: Jul. 15, 1992

[51] Int. Cl.⁶ .............................................. G09G 1/00
[52] U.S. Cl. ...................................... 345/157; 345/163
[58] Field of Search ................... 340/710, 709, 706; 74/471 XY, 471 R; 33/1 M; 324/207.22; 73/1 D; 273/438, 148 B; 345/156, 157, 158, 161, 163, 164, 166, 167, 179

[56] References Cited

U.S. PATENT DOCUMENTS

| | | | |
|---|---|---|---|
| 4,647,771 | 3/1987 | Kato | 340/710 |
| 4,754,268 | 6/1988 | Mori | 340/710 |
| 4,786,892 | 11/1988 | Kubo et al. | 74/471 XY |
| 4,856,771 | 8/1989 | Nelson et al. | 74/471 XY |
| 4,928,093 | 5/1990 | Rahman | 340/710 |
| 4,988,981 | 1/1991 | Zimmerman et al. | 340/706 |
| 5,076,584 | 12/1991 | Openiano | 273/438 |
| 5,086,296 | 2/1992 | Clark | 340/709 |
| 5,111,005 | 5/1992 | Smith et al. | 340/710 |
| 5,142,655 | 8/1992 | Drumm | 340/710 |
| 5,168,221 | 12/1992 | Houston | 340/709 |

Primary Examiner—Tommy P. Chin
Assistant Examiner—A. Au
Attorney, Agent, or Firm—Hawes & Fischer

[57] ABSTRACT

The electromechanical controller, or cursor control device, consists of a solid surrounded by a flexible bladder, the solid and bladder being received within a housing. The bladder is freely moveable relative to the solid. Movement of the bladder is sensed by X and Y transducers to generate signals which may be employed to control the visual display of a computer. In one embodiment, the device is physically connected to the computer; in another embodiment, the device incorporates a wireless transmitter to broadcast signals to a receiver associated with the computer.

4 Claims, 3 Drawing Sheets

ELECTROMAGNETIC CURSOR CONTROL DEVICE FOR A COMPUTER DISPLAY

FIELD OF THE INVENTION

The present invention broadly relates to an electromechanical controller, particularly a device for controlling movement of a cursor on a computer screen.

BACKGROUND

One of the most important changes to occur in computers during the last decade was the shift from character-based to graphic-based software. Character-based software requires a user to input one or (usually) more keystrokes on a conventional typewriter keyboard in order to execute commands. The "Macintosh" computer from Apple was the first commercially successful computer to allow the user to execute commands without using the keyboard. The Macintosh was supplied with a cursor control device, or "mouse," that translated complex motions of the mouse in two dimensions relative to the surface upon which it was moved into corresponding movements of a cursor or other icon on the monitor screen or other display device of the computer. Software designed to take advantage of the mouse-style controller allows a computer user to draw shapes by translating the movement of the mouse into movements of a "pen" or "brush" on the screen, or to choose files or commands represented by icons, "buttons," or other images on the screen by moving the mouse until the cursor is aligned with the desired file or command icon and then selecting it by "clicking" a switch located on the mouse.

The mouse itself generally consists of (1) a housing shaped to fit comfortably under the user's hand, (2) one or more buttons located on one or more surfaces of the mouse controlling dual-position switches, and (3) a mechanism used to control the on-screen movement of the icon, which generally consists of a ball of high specific gravity held within a cavity in the housing so that a small portion of the ball protrudes beyond the housing. The ball is coated with a substance with a high coefficient of friction and is held loosely within the cavity so that, for example, the ball rotates freely within the housing when the housing is moved relative to a flat horizontal surface composed of a compatible material. In a typical configuration, two generally cylindrical shafts attached to electromechanical transducers press against the ball so that the rotation of the ball is converted in to rotation of one or both of the shafts. Rotation of each such shaft creates a control signal that is supplied to the computer. The cylindrical shafts are oriented within a single plane and at a relative angle of 90° so that movement of the mouse is translated into cursor or arrow movement along both X and Y coordinates on the computer screen.

The scale used by the computer to translate movement of the mouse into movement on the screen is determined by software and is generally adjustable by the user. With high sensitivity settings, small movements of the mouse produce relatively large movements on the screen. With low sensitivity settings, relatively larger movements of the mouse are required to produce a given amount of screen movement. High sensitivity settings allow small hand movements to move the cursor across the entire screen, but make precise gestures difficult. Users therefore often choose lower sensitivity settings that allow greater precision at the cost of requiring larger hand movements and a larger surface area upon which to operate the mouse.

The requirements for large hand movements and relatively large amounts of desk or other surface area upon which to move the mouse are significant drawbacks in many applications. Another ergonomic shortcoming of the mouse is inherent in its operating principle. Because the mouse produces control signals only when the entire mouse moves, the location of the mouse constantly changes, and the user must "find" the mouse each time it is used. In applications that require only occasional use of the mouse, such as word processing and spreadsheets, the cumulative effect of the many small delays this causes can become an annoyance. A mouse is also difficult to use as a "pen" or "paintbrush:" the point of the pen, or the point around which movement of the mouse generates signals, is in effect the center of the ball, which is totally hidden from view by the ball and the body of the mouse. This greatly limits the value of a mouse in graphics and engineering applications.

A variation of this style of mouse, one that addresses some but not all of its shortcomings, is the trackball. The trackball is essentially an inverted mouse. The housing is stationary, and the ball protrudes from the top of the housing. The user creates control signals by directly manipulating the ball. As with a mouse, the sensitivity of the screen image to the movements of the ball is generally adjustable.

Because it is stationary, the trackball allows the computer user to work in a smaller space than a mouse. Trackballs are now built into the keyboards of many desktop and a few laptop computers. However, the trackball has a number of limitations as a precision controller. The mouse and the trackball are essentially equivalent in precision and ease of use for small "point-and-select" movements: each allows easy fingertip control. But when a mouse and a trackball are both calibrated for high precision, so that relatively large movements of the internal ball are required for large on-screen movement, a trackball becomes relatively inefficient and awkward. With a mouse, such movements can be accomplished with a single continuous movement of the mouse, albeit a large and space-consuming one. With a trackball, such motions are impossible. Large screen motions are likely to require a user to repeatedly lift his or her hand from the ball and stroke across the ball. Such motions are both imprecise and inefficient, particularly in graphics and engineering applications.

The degree to which such problems affect a given trackball are largely determined by the size of the ball. Currently available trackballs range in size from approximately two inches in diameter, for the largest desktop models, to approximately one-half inch for the smallest trackballs, which are designed to be attached to laptop computers. Larger trackballs allow greater precision because a larger hand movement is translated into the same movement of the ball in terms of degrees of angular movement. However, even the largest available trackballs are not well-suited to use in graphics and engineering applications because (a) large continuous gestures are impossible and (b) a stationary ball is difficult to use for precision drawing and cannot be used for tracing, both of which are essential in engineering and graphics applications.

The third major type of pointing device is the graphics tablet. These devices are marketed by a number of suppliers, including, for example, Summasketch. Unlike the mouse and the trackball, the graphics tablet is not a mechanical device. The graphics tablet consists of a flat surface containing, for example, a gridwork of wires and a pointing device containing an electric coil. The electric grid senses the electrical field generated by the coil and produces control signals that are converted by the computer into X and Y axis coordinates. The coil in the pointing device is generally imbedded in clear plastic so that the user can see the spot the device is pointing at underneath the center of the coil. Graphics tablets are thus well-suited for tasks such as tracing. The graphics tablet is superior to the mouse and the trackball for drawing and engineering applications for this reason. However, the graphics tablet is significantly more expensive than the mouse and trackball, and requires that the user devote table or desk space to a bulky pad. The maximum hand movement and the largest traceable drawing are also determined by the size of the tablet.

The choice between existing products is thus based upon a number of tradeoffs. A mouse allows relatively high precision but requires considerable desk space, and is limited by the fact that the point of the mouse is obscured by the ball and the body of the mouse. Trackballs require less space than mice, but are less precise for large gestures, particularly if the ball itself is small, and are poorly suited to engineering and drafting applications. Graphics tablets are well suited to such tasks, but are too expensive and bulky for most users. Thus, none of the existing pointing devices is entirely satisfactory.

Ideally, a cursor control or pointing device could be used as either a mouse or a trackball depending upon the software application or the preferences of the user. When used as a trackball, it should give the precision of a large trackball while sharing the small footprint of a small trackball. A pointing device should be ergonomically designed, so that it is comfortable to hold and use. Finally, a pointing device should be suitable for drawing and tracing.

These and other objects of the present invention will be apparent to those skilled in the field from the following detailed description of a preferred embodiment.

BRIEF SUMMARY OF THE INVENTION

The invention concerns an electromechanical controller or motion converter, more particularly a device for controlling the cursor of a computer display terminal. It includes a solid. A flexible sleeve envelopes the solid and is moveable in at least two generally perpendicular directions relative to the solid. A pair of electromechanical transducers are mounted relative to the solid to convert the motion of the flexible sleeve into corresponding electrical signals. Thus, by manipulating the sleeve relative to the solid, electrical signals are produced which may be employed, for example, to control the cursor of a computer display terminal.

Preferably the solid is rounded, and the flexible sleeve is a bladder that substantially completely envelopes the solid. The electromechanical transducers may be mounted either within the flexible sleeve and solid, or outside the sleeve and solid in a housing provided to hold and contain the sleeve and solid.

Preferably the solid includes a generally hemispherically shaped upper portion and a flattened lower portion, the solid thereby assuming a shape much like that of a raw egg yolk resting on a surface. Caps or covers may be provided to encase either the upper or lower portion, or both, of the solid projecting beyond the housing, thereby to provide either a mouse-style or trackball-style cursor control device.

Other features of the device are set forth in the detailed description and stated in the claims.

BRIEF DESCRIPTION OF THE DRAWINGS

The invention will be further described in connection with the accompanying drawings in which.

DETAILED DESCRIPTION

In a preferred embodiment, the invention broadly relates to an electromechanical controller or motion converter to translate movement in any of at least two generally perpendicular directions into corresponding electrical signals. It is preferred to employ such a motion transducer to control, for example, the cursor of a computer display terminal. Thus, in this text the controller is referred to as a cursor control device.

Figure 1:
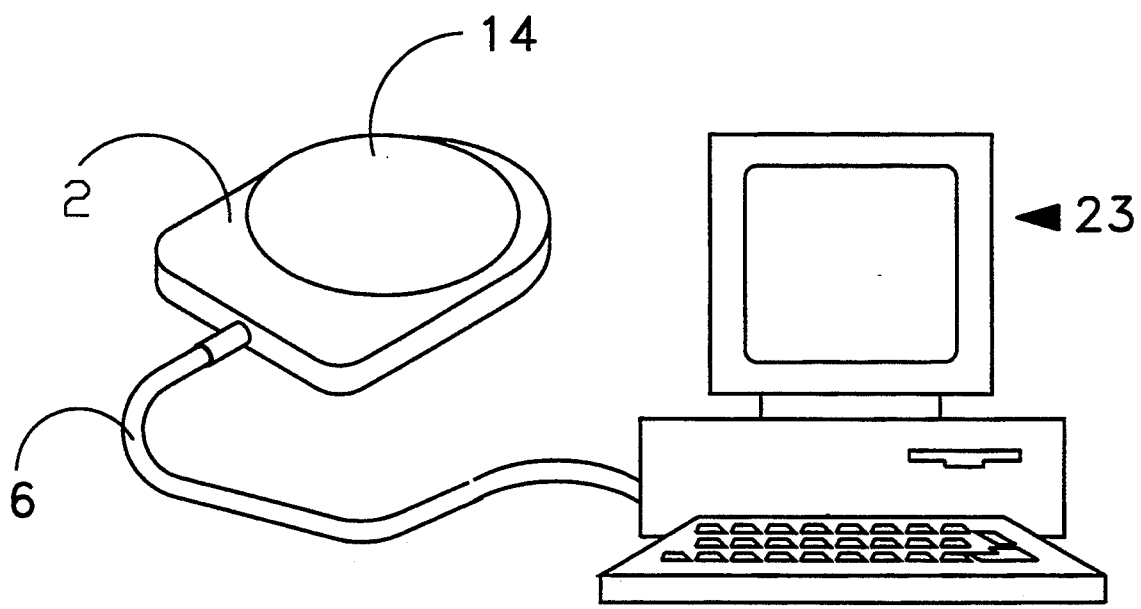
FIG. 1 is a perspective view of a preferred embodiment of the cursor control device.
Figure 2:
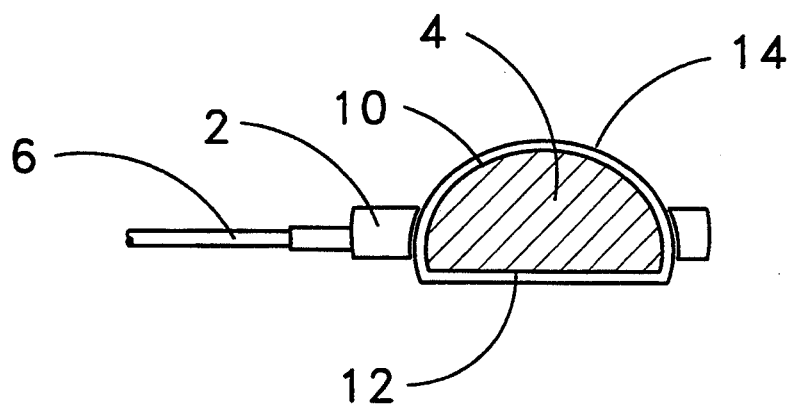
FIG. 2 is a vertical cross-sectional view of the cursor control device shown in FIG. 1, taken generally along its longitudinal axis.

A preferred embodiment of the cursor control device is shown in perspective in FIG. 1 and in cross-section in FIG. 2. Generally it includes a housing 2 surrounding a solid 4. An electrical cord 6 extends from the housing to supply the electrical signals generated by the device to a connected system, for example to a computer.

Figure 3:
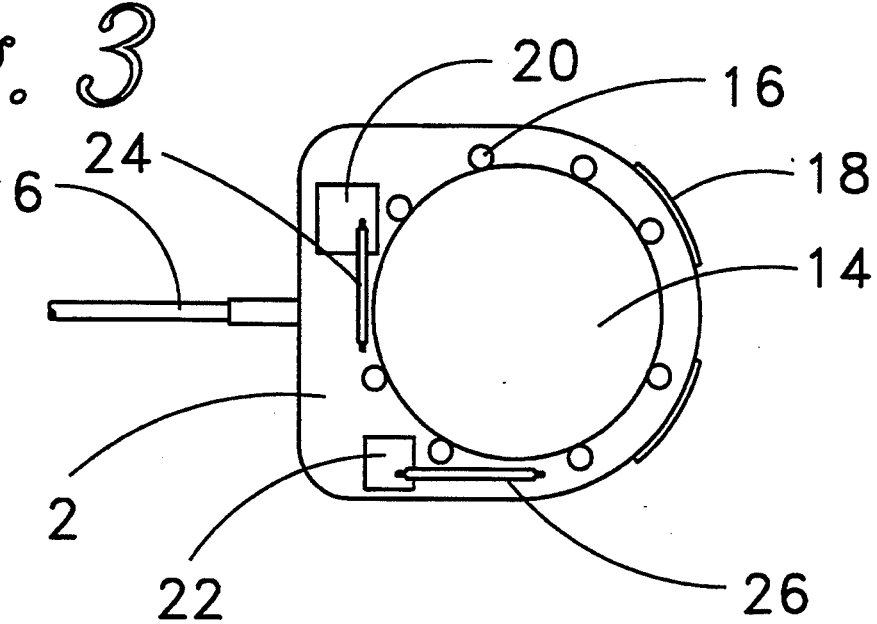
FIG. 3 is a horizontal cross-sectional view of the cursor control device shown in FIG. 1, taken generally through its midplane.

The cursor control device is shown in cross-section in both FIGS. 2 and 3. As generally shown in FIG. 2, solid 4 is in the smoothly rounded shape assumed, for example, by a raw egg yolk resting on a surface. It includes a generally hemispherical top portion 10 and a flattened bottom portion 12. The solid is enveloped by a flexible bladder 14. This bladder is sufficiently loose about the solid to permit it to be moved relative to the solid in any direction, the bladder thereby slipping over the solid and flexing to generally conform to the shape of the rounded solid 4 as it slips. This bladder 14 may, for example, be of a rubber material such as that forming a typical balloon. If desired, an appropriate lubricant such as graphite or PTFE (Teflon) may be incorporated between the inner surface of the flexible bladder and the outer surface of the solid to enhance the freedom with which the bladder moves over the solid.

The housing 2 is generally annular shaped or toroidial shaped, completely surrounding the mid-portion of the solid 4, but is sized to permit a portion of the solid to project above the top surface of the housing and a portion of the solid to project below the bottom surface of the housing, as shown in FIG. 2. Thus, the user may manually move the top surface of the bladder relative to the top surface of the solid to manipulate the device, much like a trackball, or may move the housing over a supporting surface to cause the bottom surface of the bladder to move relative to the solid, the device then operating much like a mouse.

As shown in FIG. 3, appropriate bearings and supports 16 are provided within the housing to support the housing relative to the solid and its enveloping bladder but to permit the bladder to move freely relative to the solid. A pair of electromechanical transducers 20 and 22 are received within the housing, each transducer being connected to a corresponding cylindrical roller 24 and 26, these rollers bearing upon the solid and the bladder to convert the motion of the bladder relative to the solid at the point of contact into rotation of the roller. By mounting these rollers with their axes in a perpendicular orientation, and causing the rollers to contact the bladder and solid at points whose radial orientations are perpendicular to one another, the electromechanical transducers 20 and 22 will produce electrical signals corresponding to movement of the bladder in directions orthogonal to one another, which signals transmitted over cord 6 may be employed as X and Y axis signals, for example, by a connected system such as computer system 23 shown in FIG. 1 to control cursor 23' on the visual display. Thus, a simple yet effective cursor control device is provided by the present invention which may be employed either as a trackball or a mouse depending upon the preference of the user. Because the exposed upper portion of the solid is equivalent in size and shape to the upper portion of a sphere much larger than is used in existing trackball designs, the present invention provides significantly improved ergonomics as compared to existing trackballs.

The solid 4 may be made of a transparent material, such as glass or polycarbonate, and its enveloping bladder of a similarly transparent material such as latex. When so constructed, the user may place the device on a supporting surface and view the surface through the solid and its enveloping bladder, the lens shape of the solid serving to magnify somewhat the view of the surface through the solid and bladder. Thus, if the device is placed, for example, on a map supported by a surface, the user may employ the device to accurately input the positional information on the map, for example, to a connected system.

Appropriate finger actuated switches 18 may also be provided in the device, as is conventional for a mouse, to allow the user to apply additional control signals to a connected system over cord 6.

Figure 4:
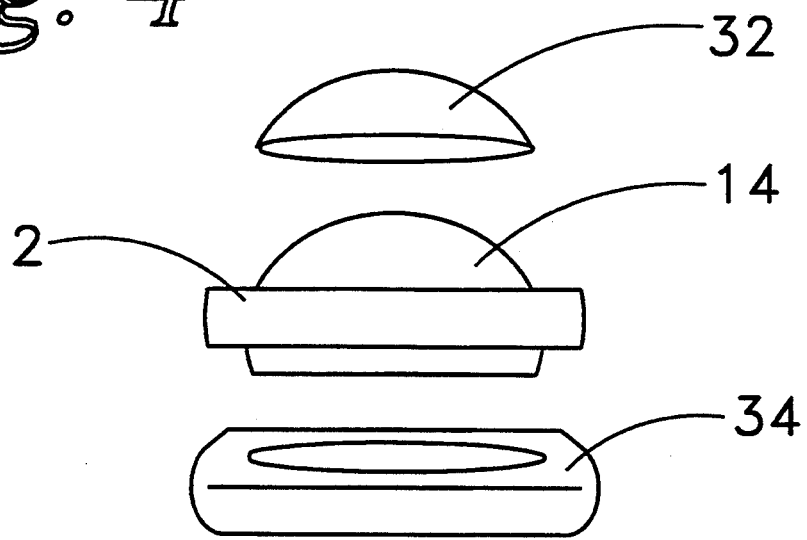
FIG. 4 is an exploded view of the cursor control device showing its upper and lower caps.

As shown in FIG. 4, various covers may be provided to cover some or all of the cursor control device. For example, a spherically-shaped cap 32 may be provided to cover the top portion of the solid 4 projecting beyond housing 2, the cap including appropriate interconnections along its rim to interconnect with structure provided on the top of the housing, such interconnections permitting the cap to be mechanically locked to the top of the housing when desired, then removed by the user when access to the top surface of the top body is desired. Such locking means may consist of a bayonet-style locking mount. Similarly, a bottom dish or base 34 is provided to receive the bottom surface of housing 2 and envelope the bottom surface of solid 4, this base also including appropriate interconnections with the housing to permit it to be easily attached and removed by the user as desired.

Figure 5:
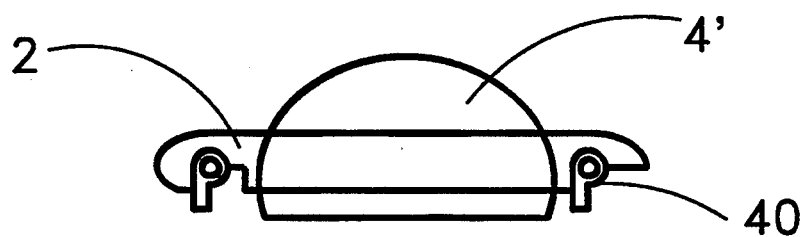
FIG. 5 is a view of another embodiment of the cursor control device.

As shown in FIG. 5, the housing 2' may be provided with pivoting legs 40 to permit the cursor control device, when desired, to be supported above a surface such as for use of solid 4' as a trackball. In this embodiment, legs 40 substantially replace and fulfill the function of base 34 in the FIG. 4 construction.

Cursor control devices of the types previously described and of the type shown in FIG. 1, for example, are connected to the computer or other device being controlled by an electrical connection, such as cord 6 shown in FIG. 1. Because of this connection, the device must always be physically adjacent the computer; because of the cord it can hardly be stored in a drawer or other convenient location between uses. Also, the electrical connection between the device and the computer has a tendency to catch on other components or articles, which may interfere with motion of the device and the control it affects. For all of these reasons, it would be desirable to provide such a cursor control device that is not physically connected, such as by a cord, to a computer or other system being controlled. Such a device is shown in FIG. 6.

Figure 6:
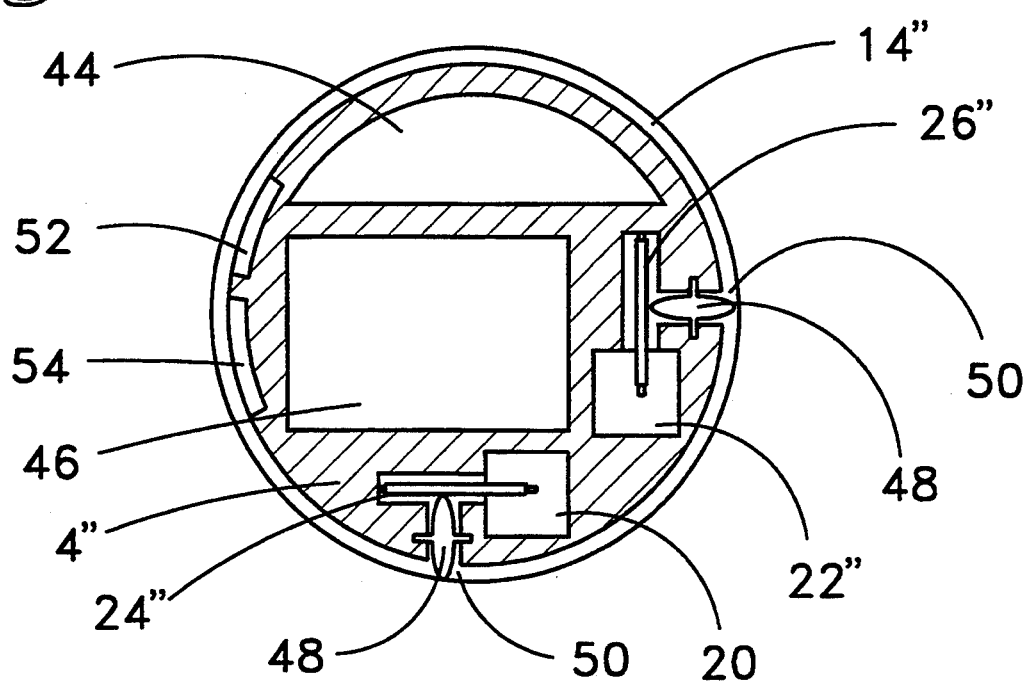
FIG. 6 is a view of a different embodiment of the cursor control device.

Much as with the construction of cursor control device 2 shown in FIG. 1, the construction shown in FIG. 6 (which figure is generally a horizontal section through the mid-plane of the device) consists of a solid outer housing 4" surrounded by flexible bladder 14". Again, this flexible bladder is freely moveable relative to the solid 4". Within solid 4" are various components including transducers 20" and 22" connected to rollers 24" and 26", the rollers driving the transducers to cause their electrical output to be related to movement of the bladder 14" over solid 4". The electrical outputs of the transducers are supplied to an appropriate wireless transmitter circuit 44 that is connected to battery 46 and broadcasts an electromagnetic signal indicative of various parameters, such as the motion of the bladder 14" over solid 4". Two jockey wheels 48 are provided, which project through windows 50 in the solid 4" to engage bladder 14", each wheel rotating in response to the movement to the bladder in the direction indicated by the major plane of the wheel. These wheels are mounted at right angles to one another (like rollers 24 and 26) and engage rollers 24" and 26", the wheels thereby transmitting the motion of the bladder in the direction indicated by the major plane of the wheel to the roller on which the wheel bears, the roller in turn being rotated by the wheel to provide either an X axis or Y axis drive to the connected transducer.

The computer or other system being controlled by the cursor control device shown in FIG. 6 has connected to it, or incorporated within it, an appropriate wireless receiver which responds to the broadcast information of wireless transmitter 44 and converts the received information into signals appropriate to control the system in a manner obvious to those skilled in this field. Battery 46 may be provided with a capacitive or inductive coupling device to recharge the battery occasionally as necessary. Also incorporated within solid 4" are one or more switches 52 which supply additional signals to the wireless transmitter circuit, and an additional switch 54 for the purpose of turning on and off the transmitter. The switches are positioned on the outer surface of the solid so that they can be activated by the user by pressing or squeezing the appropriate portion of the bladder 14".

Preferred embodiments of the invention have been shown and described. Since variations in the features of these devices will be apparent to those skilled in this field, the scope of the invention is not limited to the devices illustrated, but rather is as set forth in the following claims.

I claim:

1. An cursor control device including a solid, a flexible bladder enveloping the solid and moveable in at least two generally perpendicular directions relative to the solid, and a pair of transducers mounted relative to the solid to convert the motion of the flexible sleeve into corresponding electrical for controlling movement of a cursor the transducers being mounted within the solid.

2. A cursor control device including a rounded solid, a flexible bladder enveloping the solid and moveable in at least two generally perpendicular directions relative to the solid, and a pair of transducers mounted relative to the solid to convert the motion of the flexible sleeve into corresponding electrical signals, for controlling movement of a cursor and in which both the solid and the sleeve are transparent to permit viewing of an underlying surface through the solid and sleeve.

3. A cursor control device including a rounded solid, a flexible bladder enveloping the solid and moveable in at least two generally perpendicular directions relative to the solid, and a pair of transducers mounted relative to the solid to convert the motion of the flexible sleeve into corresponding electrical signals, for controlling movement of a cursor and in which the solid is shaped like a flattened egg yolk to provide a generally hemispherical top portion and a flattened bottom surface.

4. A cursor control device for a computer system with a visual display, the control device including an electromechanical controller having a solid, a flexible sleeve enveloping the solid and movable in at least two generally perpendicular directions relative to the solid, and a pair of transducers mounted relative to the solid to convert the motion of the flexible sleeve into corresponding electrical signals, means to transmit the electrical signals for use by an associated system whereby the controller transmits the electrical signals to the computer system to enable the controller to control motion of a cursor on the computer's associated visual display, and in which the solid and sleeve are transparent to permit viewing therethrough.

* * * * *